United States Patent [19]

Aron

[11] 4,179,726
[45] Dec. 18, 1979

[54] BARN DOOR LAMP ATTACHMENT

[75] Inventor: Daniel L. Aron, Northridge, Calif.

[73] Assignee: Mole-Richardson Co., Hollywood, Calif.

[21] Appl. No.: 834,331

[22] Filed: Sep. 19, 1977

[51] Int. Cl.² ............................................. G03B 15/02
[52] U.S. Cl. .................................... 362/17; 362/283; 362/18
[58] Field of Search ...................... 362/18, 6, 17, 282, 362/283, 294

[56] References Cited

U.S. PATENT DOCUMENTS 3,140,053   7/1964   Lowell ............................. 362/283 X Primary Examiner—Stephen J. Lechert, Jr.
Attorney, Agent, or Firm—Edward A. Sokolski

[57] ABSTRACT

An attachment for a lamp, particularly for photographic purposes, including a frame, that surrounds and releasably engages the bulb of the lamp. Light blocking barn door panels and a scrim or other light modifying device can be supported by the frame.

10 Claims, 8 Drawing Figures

U.S. Patent · Dec. 18, 1979 · 4,179,726
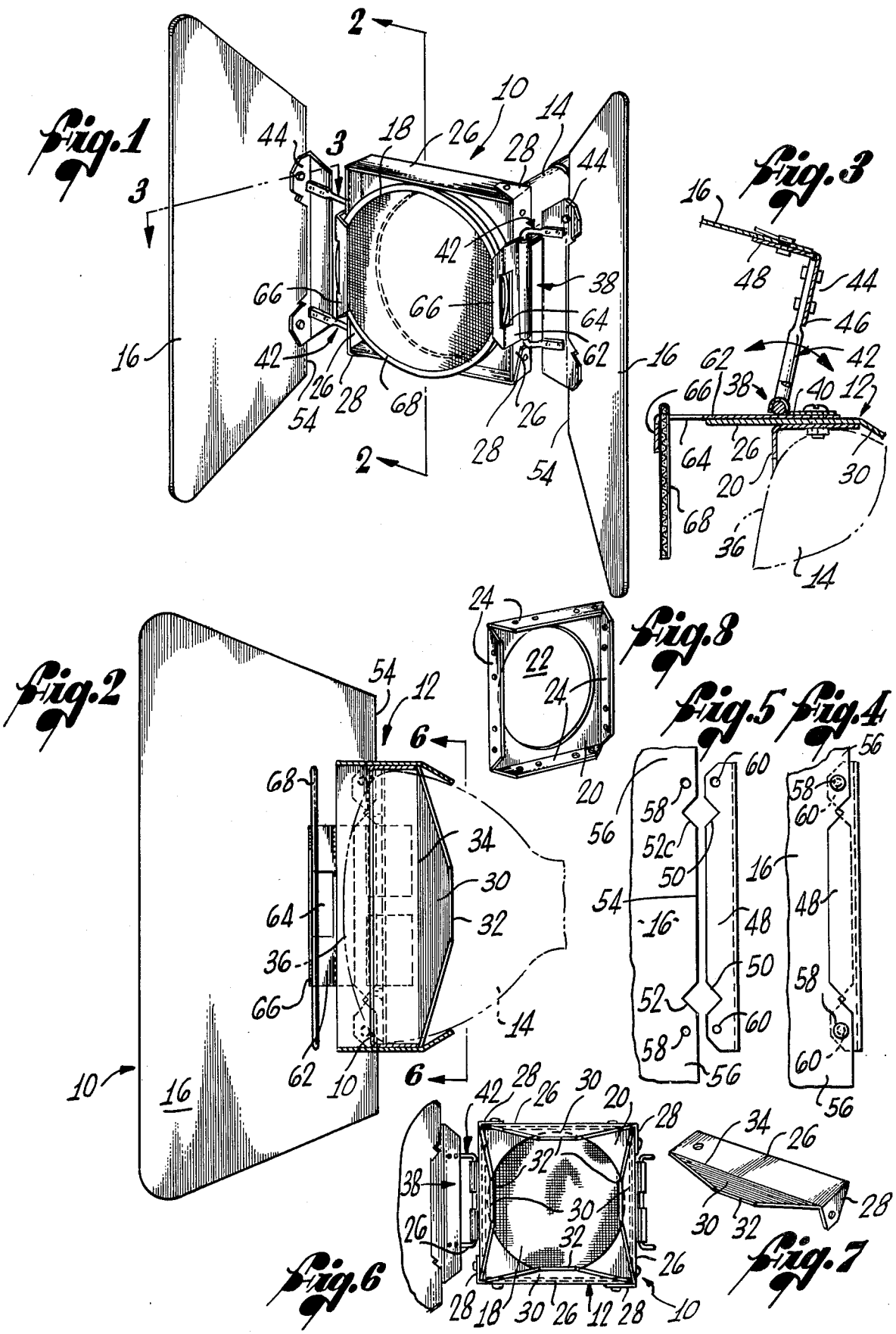

BARN DOOR LAMP ATTACHMENT

BACKGROUND OF THE INVENTION

The present invention relates to attachments for lamps, and more particularly, to attachments for controlling and modifying the light from lamps used for photographic purposes.

To achieve a desired photographic effect, it is often beneficial to control and modify the illumination of a lamp, confining it within a selected angle or softening it with a scrim placed before the bulb. Photographic lamps have, therefore, been constructed with so-called "barn doors" attached to the lamp support. These barn doors are panels usually attached in a pivotable manner so that the light can be confined within selected angular limits to avoid undesired reflections or to provide supplemental illumination on a specific portion of an area to be photographed. If the same lamp is equipped with a scrim, color filter or other light modifying device, a separate bracket for that purpose is generally required. Not all lamps are, however, equipped with barn doors and brackets for scrims. Add-on devices that are releasably secured to the lamp support are often cumbersome, time consuming to install and restricted to use with a particular type or style of support.

A principal objective of the present invention is to improve the versatility of photographic lamps by providing an inexpensive attachment that can be quickly and easily secured to any of a wide variety of lamps to support barn door panels or a scrim.

SUMMARY OF THE INVENTION

The present invention provides a lamp attachment in accordance with the above objective, utilizing a frame that engages the lamp bulb rather than the lamp support. It is, therefore, usable without regard to the configuration of the support.

In a preferred embodiment, the frame includes a flat centerpiece having a circular opening that exposes the face of the bulb. Sidepieces are attached perpendicularly to the edges of the centerpiece to surround the bulb. The centerpiece is pressed against the bulb by resilient retaining members which may take the form of tabs bent inwardly from the rear edges of the sidepieces.

The frame can be used to support pivotably mounted barn door panels. Although it will often be desired to position the panels vertically, the frame can be rotated on the bulb to give the panels any desired orientation. The panels can be detached from their hinges or they can be folded across the front of the frame for storage.

The frame also includes brackets by which it can support a removable light modifying device such as a scrim. The brackets may take the form of resilient plates that extend from the sidepieces, each plate having a slot to engage the outer edge of a disk-shaped scrim.

Other aspects and advantages of the invention will become apparent from the following detailed description, taken in conjunction with the accompanying drawings.

BRIEF DESCRIPTION OF THE DRAWINGS

FIG. 1 is a perspective view of an exemplary lamp attachment embodying many novel features of the present invention;

FIG. 2 is an enlarged sectional view of the attachment taken along the line 2—2 of FIG. 1;

FIG. 3 is an enlarged, fragmentary, sectional view of the attachment, taken along the line 3—3 of FIG. 1;

FIGS. 4 and 5 are enlarged, fragmentary views showing the releasable connection between a barn door panel and the corresponding hinge, the components being shown in their secured and detached conditions, respectively;

FIG. 6 is a fragmentary, sectional view of the attachment, on a reduced scale, taken along the line 6—6 of FIG. 2;

FIG. 7 is a perspective view of the sidepiece and retainer member of the attachment; and FIG. 8 is a perspective view on a reduced scale, of the centerpiece of the attachment.

DESCRIPTION OF THE PREFERRED EMBODIMENT

An attachment 10 for a lamp, particularly useful for photographic purposes, is shown in FIGS. 1 through 8 of the accompanying drawings. In general, it includes a frame 12 which releasably engages the front end of a lamp bulb 14 to support a pair of barn door panels 16 and a scrim 18.

The frame 12 includes a centerpiece 20 (FIG. 8) in the form of a flat plate of square outline having a large centrally located circular opening 22. Along each of the four edges of the centerpiece 20 there extends an attachment member 24 which is integrally formed with the centerpiece and bent at a right angle thereto. Four sidepieces 26 (FIG. 7) are each secured by rivets to one of the attachment members 24 (FIGS. 1, 2, 3 and 6). Each sidepiece 26 carries a corner section 28 extending at a right angle to its main section and overlapping the adjacent sidepiece to which it is secured by a rivet. The four sidepieces 26 are thus arranged in a square forming a box-like structure. The centerpiece 20 extends across the open center of the box being joined to the sidepiece 26 near their longitudinal center lines.

Along the rear edge of each sidepiece 26, is an integrally formed tab 30 that is bent so that it extends inwardly from the sidepiece 26 and, at the same time, rearwardly away from the centerpiece 20 (FIGS. 2, 6 and 7). Each tab 30 is trapezoidal having a relatively short edge 32 parallel to its longest edge 34 where it is joined to the corresponding sidepiece 26.

The frame 12 is so dimensioned that the front end of the conventional photographic lamp bulb 14 is snugly surrounded by the sidepieces 26 and pressed up against the centerpiece 20 where it is releasably secured and retained by the tabs 30. The size of the opening 22 is such that substantially the entire face 36 of the bulb 14 is exposed and the frame 12 does not interfere significantly with the illumination from the bulb. The frame 12 can easily be slipped on and off the bulb 14, since the retaining tabs 30, like the other components of the frame, are made of resilient metal stampings and are, therefore, readily bendable but provide a sufficient frictional force to prevent the frame from turning or becoming dislodged.

One purpose of the frame 12 is to support the light-blocking barn doors 16 which are pivotably attached to the frame by hinges 38 (FIGS. 1, 3 and 6). Each hinge 38 includes a clamping member 40 formed by a metal sheet rolled to form a partial cylinder extending longitudinally along one of the sidepieces 26 parallel to the centerpiece 20. The center section of a U-shaped rod 42 is rotatably held within the clamping member 40 so that its two ends project away from clamping member at a 90 degree angle. The ends of each rod 42 are connected by a holding member 44 to which they are riveted. Each holding member 44 includes an elongated first section 46 to which the rod 42 is attached and a second section 48 bent at a right angle to the first section. When the ends of the rod 42 are perpendicular to the sidepieces 26, the second sections 48 extend away from the tabs 30 and toward the direction of illumination.

A pair of V-shaped notches 50 are cut into the edge of each second section 48 to interlock with equally spaced V-shaped notches 52 on the corresponding barn door 16 (FIGS. 4 and 5). When attached to the holding member 44, the barn door panel 16 is slightly flexed so that its center portion between the notches 52 is disposed inwardly of the holding member, while the portions 56 of the panel that are outboard of the interlocking notches are disposed on the opposite side of the holding member. Each outboard portion 56 of the panel 16 includes a lug 58 received by an aperture 60 in the holding member. The barn door panels 16 can be readily detached from the holding members 44 by flexing them slightly so that the lugs 58 disengage the apertures 60. This flexing movement permits the panels 16 to be removed completely when not in use or when they are to be replaced by panels of a different size. The preferred panels 16 are trapezoidal with the notches 52 cut into their shorter parallel edges.

So that the entire attachment 10 can be folded into a small compact unit, the length of the projecting ends of the U-shaped rods 42 are sufficient to extend to the front edge of the sidepieces 26, allowing the barn door panels 16 to be rotated so that they cover the open front end of the frame 12, being superimposed on each other and overlying the opening 22. When, in use, the barn doors 16 are generally employed in a vertical orientation but may be given any other orientation desired by rotating the frame 12 on the bulb 14.

An additional function of the frame 12 is to hold the scrim 18 before the front end of the bulb 14. For this purpose, two plates 62 overlie the outer surfaces of two opposing sidepieces 26 (FIGS. 1, 2 and 3) extending from beneath the clamping members 40 beyond the leading edges of the sidepieces. The projecting portions of these plates 62 contain rectangular slots 64, and have narrow leading edges 66 that are bent inwardly toward each other. The plates 62 form a bracket for holding the scrim 18, which is a circular section of wire or cloth mesh having a relatively rigid ring-like circumferential supporting member 68 (FIGS. 1 and 2). It should be understood, however, that the term "scrim" as used herein refers to any type of light diffusing element. The diameter of the scrim 18 is such that it is received and held within the slots 64 but can be released by flexing the plates 62 outwardly away from each other. Although a scrim 18 is used in this embodiment, other appropriately shaped light modifying devices such as color filters may be held by the plates 62.

It should be noted that the attachment 10 can be manufactured at low cost since it is of relatively simple construction. It is also lightweight, compact and can be used on any suitable lamp regardless of the configuration of the lamp support. While a particular form of the invention has been illustrated and described, it will be apparent that various modifications can be made without departing from the spirit and scope of the invention.

I claim:

1. An attachment for a lamp comprising:
    a frame including a flat centerpiece that is substantially square in outline and dimensioned to surround a light bulb, a circular opening defined by said centerpiece, said opening being of sufficient diameter to expose substantially the entire face of said light bulb, and four sidepieces rigidly and immovably attached to the edges of said centerpiece, arranged perpendicular thereto and connected to each other in a box-like manner;
    at least four resilient retaining tabs each of which is integrally formed with one of said sidepieces extending inwardly therefrom and away from said centerpiece to releasably retain the front end of said light bulb between said tabs and said centerpiece;
    a pair of light blocking barn door panels;
    hinge means for pivotably attaching each of said panels to one of said sidepieces;
    a pair of opposing, parallel, resilient plates extending from two of said sidepieces away from said retaining tabs, said plates having slots therein; and
    a means for modifying the light from said lamp inserted in said slots and thus releasably held by said plates across said opening overlying the face of said bulb.

2. The attachment of claim 1 further comprising means for releasably securing said barn door panels to said hinge means.

3. The attachment of claim 1 wherein each of said hinge means comprises a U-shaped rod, a clamping member attached to one of said sidepieces by which said rod is pivotably engaged, a holding member connected to the ends of said rod, said holding member and said corresponding panel having a plurality of interlocking notches, and a plurality of lugs and corresponding apertures by which said barn door panels are releasably secured to said hinge means.

4. The attachment of claim 1 further comprising a disk-shaped scrim having a circumferential edge engaged by said slots and serving as said light modifying means.

5. An attachment for a lamp comprising:
    a frame including a flat centerpiece that is substantially square in outline and dimensioned to surround a light bulb, a circular opening defined by said centerpiece, said opening being of sufficient diameter to expose substantially the entire face of said light bulb, and four sidepieces rigidly and immovably attached to the edges of said centerpiece, arranged perpendicular thereto and connected to each other in a box-like manner;
    at least four resilient retaining tabs each of which is integrally formed with one of said sidepieces extending inwardly therefrom and away from said centerpiece to releasably retain the front end of said light bulb between said tabs and said centerpiece;
    a pair of light blocking barn door panels; and
    hinge means for pivotably attaching each of said panels to one of said sidepieces.

6. The attachment of claim 5 wherein said barn door panels are trapezoidal.

7. The attachment of claim 5 further comprising a plurality of bracket means for releasably holding a light modifying device across said opening in front of said bulb.

8. The attachment of claim 5 further comprising means for releasably securing said barn door panels to said hinge means.

9. An attachment for a lamp comprising:
- a frame including a flat centerpiece that is substantially square in outline and dimensioned to surround a light bulb, a circular opening defined by said centerpiece, said opening being of sufficient diameter to expose substantially the entire face of said light bulb, and four sidepieces rigidly and immovably attached to the edges of said centerpiece, arranged perpendicular thereto and connected to each other in a box-like manner;
- at least four resilient retaining tabs each of which is integrally formed with one of said sidepieces extending inwardly therefrom and away from said centerpiece to releasably retain the front end of said light bulb between said tabs and said centerpiece;
- a pair of trapezoidal light blocking barn door panels;
- hinge means for pivotably attaching each of said panels to one of said sidepieces comprising a U-shaped rod, a clamp member attached to one of said sidepieces by which said rod is pivotably engaged, a holding member connected to the ends of said rod, said holding member and said corresponding panel having a plurality of interlocking notches, and a plurality of lugs and corresponding apertures by which said barn door panels are releasably secured.

10. An attachment for a lamp comprising:
- a frame including a flat centerpiece that is substantially square in outline and dimensioned to surround a light bulb, a circular opening defined by said centerpiece, said opening being of sufficient diameter to expose substantially the entire face of said light bulb, and four sidepieces rigidly and immovably attached to the edges of said centerpiece, arranged perpendicular thereto and connected to each other in a box-like manner;
- at least four resilient retaining tabs each of which is integrally formed with one of said sidepieces extending inwardly therefrom and away from said centerpiece to releasably retain the front end of said light bulb between said tabs and said centerpiece;
- a pair of trapezoidal light blocking barn door panels;
- hinge means for pivotably attaching each of said panels to one of said sidepieces comprising a U-shaped rod, a clamping member attached to one of said sidepieces by which said rod is pivotably engaged, a holding member connected to the ends of said rod, said holding member and said corresponding panel having a plurality of interlocking notches, and a plurality of lugs and corresponding apertures by which said barn door panels are releasably secured to said hinge means;
- a pair of opposing, parallel, resilient plates extending from two of said sidepieces away from said retaining tabs, said plates having slots therein;
- a means for modifying the light from said lamp inserted in said slots and thus releasably held by said plates across said opening overlying the face of said bulb; and
- a disk-shaped scrim having a circumferential edge engaged by said slots and serving as said light-modifying means.

* * * * *